March 6, 1962 C. ROUBY 3,023,528
FIREARM WITH ELECTRICALLY ACTUATED FIRING MEANS
Filed April 18, 1960 2 Sheets-Sheet 1
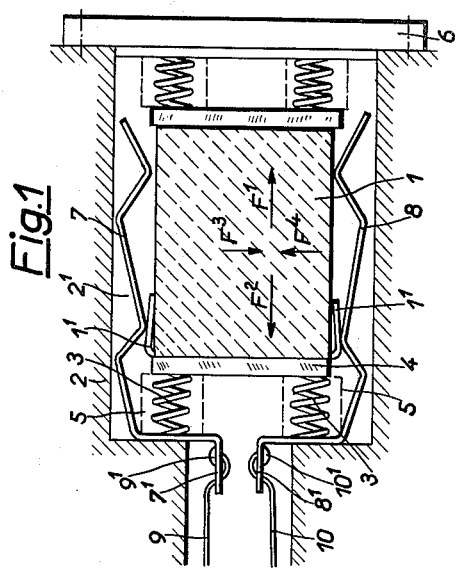
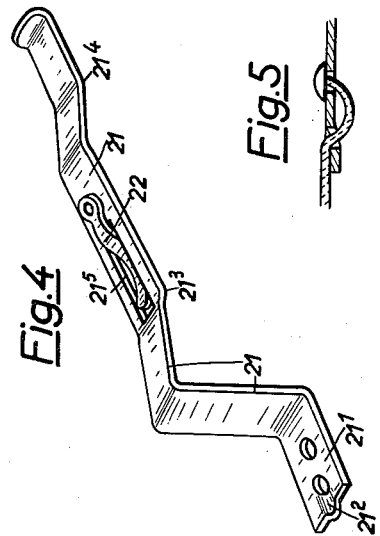
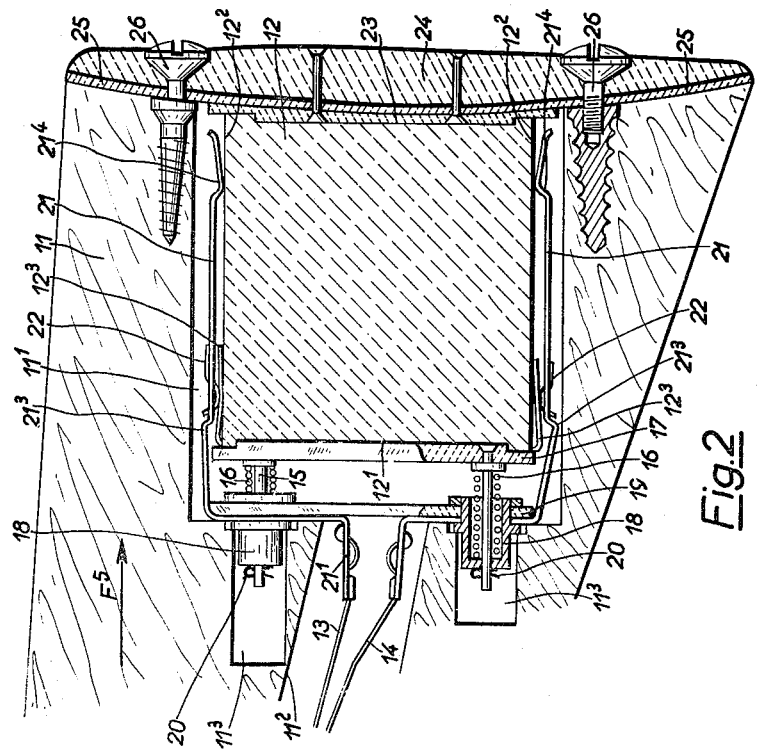

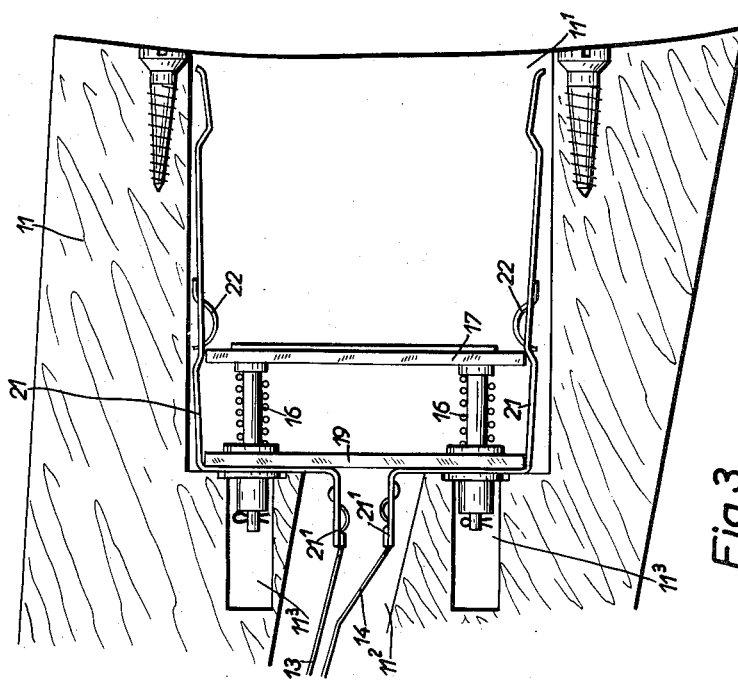

United States Patent Office 3,023,528
Patented Mar. 6, 1962

3,023,528
FIREARM WITH ELECTRICALLY ACTUATED
FIRING MEANS
Charles Rouby, Saint-Etienne, France, assignor to Societe Moderne de Fabrications Mecaniques, Saint-Etienne, France, a French company
Filed Apr. 18, 1960, Ser. No. 22,766
Claims priority, application France Apr. 24, 1959
4 Claims. (Cl. 42—84)

This invention relates to damping means for batteries and other electric current generators.

In many applications, batteries or other electric current generators or electric current distributors are employed, which are fitted under special conditions since they are continuously or periodically subject to vibrations, shocks or other destructive or deteriorating actions. This is the case, for example, with electrical equipment, electrically fired firearms, rocket launching devices, electrical apparatus employed on vehicles of all kinds, or fixed installations subject to vibrations or shocks. There may be more specifically mentioned the problem of fitting batteries or generators in electrically fired weapons employed in hunting, firing, defense and war and sealing guns and devices.

According to the present invention there is provided damping means including a housing for the reception of a battery, a rigid bearing plate for application to the exterior of the battery, and resilient means arranged between said plate and the housing for absorbing shocks and impacts applied to the housing.

The permanence of the contact at the connections to the terminals of the battery or to the generator is effected by direct clamping of the wires on the terminals, or by a resilient spring contact, the said reliable and permanent connection being advantageously effected according to the invention by interlacing and soldering of the end of the wire or wires to be connected, with the blade or blades or terminal or terminals of the battery or generator or an intermediate member.

For a better understanding of the invention and to show how the same may be carried into effect, reference will now be made to the accompanying drawings, in which:

FIGURE 1 illustrates diagrammatically damping means according to the invention, supporting for example a generator, FIGURE 2 illustrates diagrammatically damping means according to the present invention, for supporting a battery in the butt of an electrically fired rifle, FIG. 3 illustrates apparatus according to the invention for supporting a battery in the butt;

FIG. 3a illustrates the battery prior to introduction of the same into the butt;

FIG. 3b illustrates a rear closing plate or bearing plate according to the invention, FIGURE 4 is a perspective view of a detail of FIGURE 2, and FIGURE 5 is an enlarged sectional view of a further detail of FIGURE 2.

For a description of the basic features of the damping means according to the invention, reference will now be made to FIGURE 1 in which a generator 1 is disposed in a recess $2^1$ of a support 2 designed to receive the generator. The latter is supported in the recess $2^1$ by two pairs of springs 3 through the intermediary of a plate 4 provided at each end of which plates 4 distribute the thrusts and resilient reactions exerted on the generator in the longitudinal directions $F^1$ and $F^2$. Shocks and vibrations are thus damped over a large surface of the generator. The springs 3 may be replaced by blocks 5, represented by broken lines, or rubber or other appropriate resilient material. Alternative resilient means such as pneumatic devices or devices combining springs, resilient blocks and pneumatic means, may also be employed. The springs 3 may be maintained by any sliding or fixed guide arrangement, or may be fixed in the recess of the support 2, or may be fixed to the plates 4. The same applies with any other resilient means which may be employed.

A plate or cover 6 closes the recess $2^1$ and provides a bearing surface for the adjacent resilient means.

In the direction perpendicular to the arrows $F^1$—$F^2$, shocks or vibrations received and transmitted to the generator by the spring, in the direction of the arrows $F^3$—$F^4$, are damped by further resilient means, which are, in the present instance, leaf springs 7 and 8 fixed, for example, in the recess in the support, which leaf springs are resiliently disposed between the sides of the recess $2^1$ and the generator 1. The leaf springs 7 and 8 are also adapted to come into contact with the terminals of the generator, which may be terminal strips $1^1$ in the case of a battery. The ends $7^1$—$8^1$ of the leaf springs constitute the junction or connecting terminals for wires 9 and 10 of the feed circuit.

Instead of the leaf springs 7 and 8, other resilient means, for example of the kind previously described, may be employed.

In some cases, the generator may be so mounted in the recess $2^1$ as to have no clearance in the direction perpendicular to the plane of FIGURE 1, so that no intermediate resilient means are required on those two sides. However, it is possible in this case also to provide and arrange resilient means in such manner that they take effect when the generator has been positioned in its recess.

When shocks and vibrations occur in a clearly defined direction, the resilient damping means are designed to operate solely in this direction and even only in the sole direction necessary for absorbing the shocks.

The wires 9 and 10 are joined to the terminals $7^1$—$8^1$ of the conductive leaf springs 7 and 8 by interlacing their end portions through holes or perforations in the terminals as shown and soldering their ends at $9^1$—$10^1$. This form of connection will withstand shocks or prolonged vibrations, and is free from the danger of breakage of the soldered joints or of bad contact.

The invention is particularly applicable, as illustrated in FIGURES 2 to 5, to electrically fired sporting rifles or other electrically fired rifles. In this case, the considerable shocks due to recoil are exerted essentially in the direction of the arrow $F^5$ (FIGURE 2).

The butt 11 of the rifle is cut away in its thickness at the rear to form a recess $11^1$ to receive a battery 12. A channel $11^2$ opening in the recess $11^1$ is provided for the passage of wires 13 and 14 of the feed circuit.

Since the shocks and forces are exerted essentially in the direction of the arrow $F^5$, the damping means are mounted between the battery and the bottom of the recess $11^1$. These means are coil springs 16 coiled and guided around rods 15 fixed at one end by rivetting or otherwise in a plate 17 bearing against the front face $12^1$ of the battery and distributing the pressure and the thrust, as has been explained. The plate 17 is made of any insulating material, for example of synthetic plastic material.

The free ends of the rods 15 are guided with a sliding action in bearings 18 fixed in holes $11^3$ formed in the bottom of the recess $11^1$ to permit relative displacement of the rods 15 when the recoils of the rifle are damped in relation to the battery.

A plate 19 of insulating material is secured by nuts or other means on extensions of the bearings 18. The free ends of the rods 15 are retained in the holes 11³ against the bearings 18, for example by split pins 20.

The upper and lower faces 12² of the battery are resiliently supported in relation of the recess 11¹ in such manner as to ensure conduction of current from the terminals of the battery, which consist in well known manner of strips 12³ (FIG. 3a) bent over along the faces 12². This support is provided by resilient blades 21 (see FIGURE 4) which are fixed, for example, by being clamped between the plate 19 and the bottom of the recess 11¹.

The ends 21¹ of the blades 21 are bent over into the channel 11² and constitute terminals for the connection of the wires 13 and 14. This connection is made by interlacing and soldering the ends of the wires 13 and 14 as clearly illustrated in FIGURE 5. Each end 21¹ may be formed with a depression 21² to guide the end portion of the wire 13 or 14 and to maintain it transversely.

The other bent-over portions of the strips 21 are formed so as to project towards the interior of the recess 11¹ and to grip the battery 12 resiliently and to maintain it in position. The said portions are for this purpose bent over twice, namely at 21³ and at 21⁴.

The contact of the leaf springs 21 with the strips 12³ of the battery is effected by means of counter-springs 22. Each counter-spring is fixed at one end to its leaf spring, for example by rivetting, while a curved portion of the counter-spring extends through an aperture 21⁵ in the leaf spring so as to bear resiliently against the corresponding strip 12³.

The recess 11¹ in the butt is closed by a plate 23 (FIG. 3b) of insulating material, which is fixed by rivets, screws or other means to the butt plate 24. The latter bears against the rear end of the butt through a packing 25 of rubber or other flexible material. The battery is thus completely protected from infiltration and external action. Screws 26 fix the butt plate against the butt.

The effects of these means will be apparent from the description thereof and the drawings. There are particularly to be noted: the rigid element or plate 17 disposed between the resilient element or elements and the battery; the function of the leaf springs 21, which maintain the battery in position, while the counter-springs 22 fixed on the said leaf springs ensure permanent contact and a constant voltage in the circuit; the connection of the wires 13 and 14 to the end 21¹ of the leaf springs 21, in such manner that the welded joint is substantially indestructible, because it merely has the function of assembly, while the applied forces are taken up by the interlacing between the wires and the leaf springs; the bending of the leaf springs, more especially at 21³, which forms a boss directed towards the interior of the recess, is such that when it is desired to withdraw the battery from its recess, the plate 17 comes into contact with the bosses 21³ and moves the leaf springs 21 apart, thus releasing the battery and automatically partially extracting it from the recess 11¹. This greatly facilitates the positioning and extraction of the battery.

I claim:

1. A firearm including electrically actuated firing means and having an action and reaction axis, said firearm comprising a butt defining a recess, a voltage source in said recess and having spaced faces transverse to said axis and lateral faces extending between the first said faces, terminals on said source, damping means engaging said spaced faces and applying shock absorbing, resilient opposed forces thereagainst in parallel to said axis, resilient terminal engaging means engaging said lateral faces and applying resilient opposed forces thereagainst transversely of said axis, said terminal engaging means operatively engaging said source in electrically continuous manner via the said terminals, and wires fixedly secured to said terminal engaging means and adapted for supplying electrical current to said firing means from said source.

2. A firearm as claimed in claim 1, wherein said wires have interlaced engagement with said terminal engaging means.

3. A firearm as claimed in claim 1, wherein said terminal engaging means includes leaf-springs engaging opposite of said lateral faces and counter-springs on said leaf-springs engaging said terminals.

4. A firearm as claimed in claim 3, wherein said terminals are positioned on said opposite lateral faces and said leaf-springs and said counter-springs respectively engage said source and terminals at spaced positions on said lateral faces whereby the source is supported both by said leaf-springs and by said counter-springs.

References Cited in the file of this patent

UNITED STATES PATENTS 337,872    Russell _____ Mar. 16, 1886

FOREIGN PATENTS 215,597    Germany _____ Oct. 30, 1909
440,343    France _____ July 8, 1912
463,216    France _____ Feb. 17, 1914